(12) United States Patent
Liu et al.

(10) Patent No.: US 11,811,514 B2
(45) Date of Patent: Nov. 7, 2023

(54) METHOD, ELECTRONIC DEVICE, AND COMPUTER PROGRAM PRODUCT FOR REQUEST CONTROLLING

(71) Applicant: DELL PRODUCTS L.P., Round Rock, TX (US)

(72) Inventors: Min Liu, Shanghai (CN); Yongsheng Guo, Shanghai (CN); Yubing Zhang, Shanghai (CN); Zhihong Zeng, Shanghai (CN); Meng Zhou, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/678,789

(22) Filed: Feb. 23, 2022

(65) Prior Publication Data
US 2023/0231816 A1    Jul. 20, 2023

(30) Foreign Application Priority Data
Jan. 14, 2022   (CN) .......................... 202210044287.2

(51) Int. Cl.
*H04L 47/70* (2022.01)
(52) U.S. Cl.
CPC ................................. *H04L 47/822* (2013.01)
(58) Field of Classification Search
CPC .................................................... H04L 47/822
See application file for complete search history.

(56) References Cited

U.S. PATENT DOCUMENTS

| | | | | |
|---|---|---|---|---|
| 11,481,156 | B1 * | 10/2022 | Au | G06F 3/0613 |
| 2016/0099889 | A1 * | 4/2016 | Yuan | H04L 47/827 |
| | | | | 709/226 |
| 2019/0089647 | A1 * | 3/2019 | Das | H04L 47/72 |
| 2022/0060430 | A1 * | 2/2022 | Milton | G06Q 20/405 |

* cited by examiner

*Primary Examiner* — Glenton B Burgess
*Assistant Examiner* — Jihad K Boustany
(74) *Attorney, Agent, or Firm* — WOMBLE BOND DICKINSON (US) LLP

(57) ABSTRACT

Embodiments of the present disclosure relate to a method, an electronic device, and a computer program product for request controlling. The method includes determining, in response to receiving a request for computing resources, a first control window including a plurality of control time slots, the request being received in a receive time slot of the plurality of control time slots. The method further includes determining a quantity of available computing resources within the first control window according to a position of the receive time slot in the plurality of control time slots. The method further includes processing the request within the first control window if the quantity of available computing resources does not exceed a threshold. The method can improve the capability of controlling requests for computing resources, and reduce congestion caused by a large number of requests exceeding the load of computing resources.

17 Claims, 4 Drawing Sheets

METHOD, ELECTRONIC DEVICE, AND COMPUTER PROGRAM PRODUCT FOR REQUEST CONTROLLING

CROSS-REFERENCE TO RELATED APPLICATION

This patent application claims priority, under 35 U.S.C. § 119, of Chinese Patent Application No. 202210044287.2, filed Jan. 14, 2022, which is incorporated by reference in its entirety.

TECHNICAL FIELD

Embodiments of the present disclosure relate to the field of computer technologies, and more specifically, to a method, an electronic device, an apparatus, a medium, and a computer program product for request controlling.

BACKGROUND

When applications request computing resources through application programming interfaces (API), if the number of requests is large and request control is not performed, it is easy to cause congestion. Moreover, in addition to normal API requests, there are some malware that may send requests for computing resources in batches, causing serious congestion. In the prior art, for requests sent to computing resources, a queue mechanism is generally used to process these requests. However, such mechanism cannot timely and efficiently handle the case where a large number of requests are congested in the queue and the case where batches of requests are sent by malware. Therefore, there is a need for a method for request controlling to improve the capability of controlling requests for computing resources and rejecting batches of requests sent by malware.

SUMMARY OF THE INVENTION

Embodiments of the present disclosure provide a method, an electronic device, an apparatus, a medium, and a computer program product for request controlling.

In a first aspect of the present disclosure, a method for request controlling is provided. The method includes determining, in response to receiving a request for computing resources, a first control window including a plurality of control time slots, the request being received in a receive time slot of the plurality of control time slots. The method further includes determining a quantity of available computing resources within the first control window according to a position of the receive time slot in the plurality of control time slots. The method further includes processing the request within the first control window if the quantity of available computing resources does not exceed a threshold.

In a second aspect of the present disclosure, an electronic device is provided. The electronic device includes a processor and a memory coupled to the processor, the memory having instructions stored therein which, when executed by the processor, cause the device to perform actions. The actions include determining, in response to receiving a request for computing resources, a first control window including a plurality of control time slots, the request being received in a receive time slot of the plurality of control time slots. The actions further include determining a quantity of available computing resources within the first control window according to a position of the receive time slot in the plurality of control time slots. The actions further include processing the request within the first control window if the quantity of available computing resources does not exceed a threshold.

In a third aspect of the present disclosure, an apparatus for request controlling is provided. The apparatus includes: a control window establishing module configured to determine, in response to receiving a request for computing resources, a first control window comprising a plurality of control time slots, the request being received in a receive time slot of the plurality of control time slots. The apparatus further includes a resource quantity determining module configured to determine a quantity of available computing resources within the first control window according to a position of the receive time slot in the plurality of control time slots. The apparatus further includes a request control module configured to process the request within the first control window if the quantity of available computing resources does not exceed a threshold.

In a fourth aspect of the present disclosure, a computer-readable storage medium is provided. The computer-readable storage medium has one or more computer instructions stored thereon, wherein the one or more computer instructions are executed by a processor to implement the method according to the first aspect.

In a fifth aspect of the present disclosure, a computer program product is provided. The computer program product includes one or more computer instructions, wherein the one or more computer instructions are executed by a processor to implement the method according to the first aspect.

The Summary of the Invention part is provided to introduce the selection of concepts in a simplified form, which will be further described in the Detailed Description below. The Summary of the Invention part is neither intended to identify key features or main features of the claimed subject, nor intended to limit the scope of the claimed subject.

BRIEF DESCRIPTION OF THE DRAWINGS

The above and other features, advantages, and aspects of the embodiments of the present disclosure will become more apparent when taken in conjunction with the accompanying drawings and with reference to the following detailed description. In the accompanying drawings, identical or similar reference numerals represent identical or similar elements, in which.

In all the accompanying drawings, identical or similar reference numerals indicate identical or similar elements.

DETAILED DESCRIPTION

Figure 1:
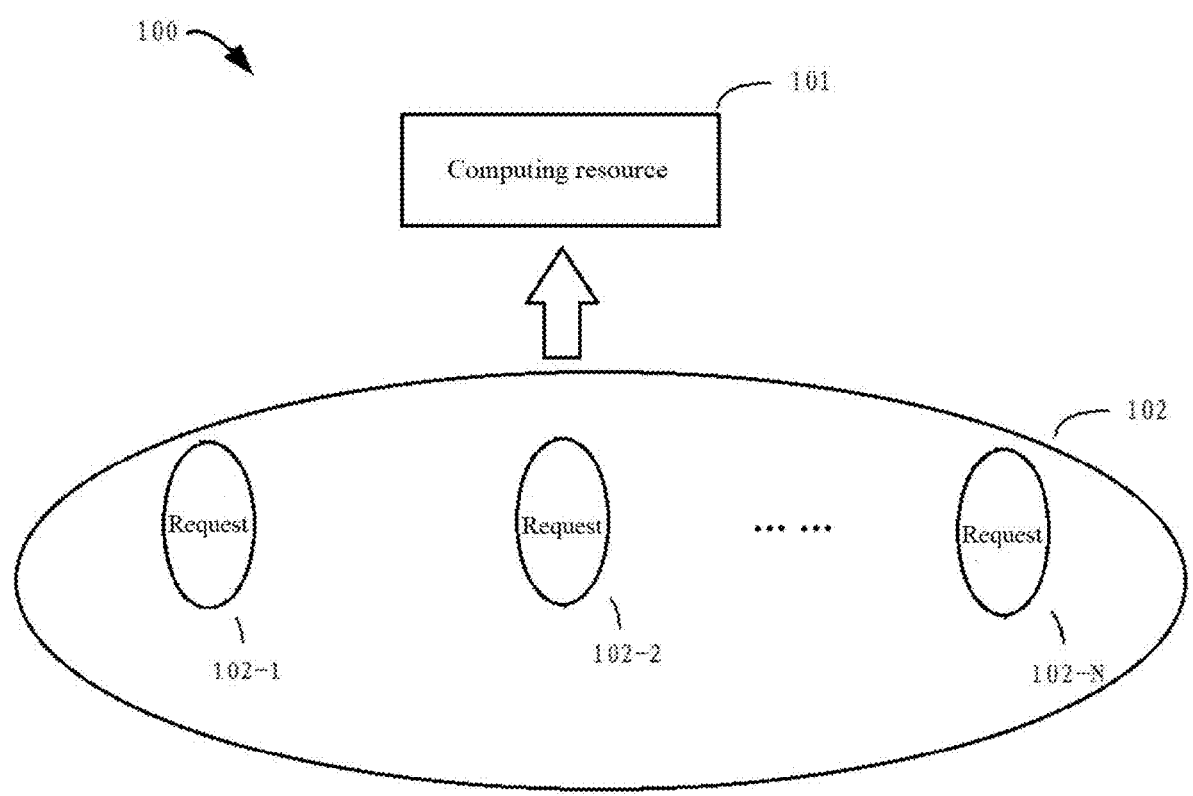
FIG. 1 illustrates a schematic diagram of an example environment in which embodiments of the present disclosure can be implemented.

Embodiments of the present disclosure will be described in more detail below with reference to the accompanying drawings. Although some embodiments of the present disclosure are shown in the drawings, it should be understood that the present disclosure can be implemented in various forms and should not be construed as limited to the embodiments set forth herein. Instead, these embodiments are provided for a more thorough and complete understanding of the present disclosure. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." The terms "first," "second," and the like may refer to different or the same objects. Other explicit and implicit definitions may also be included below.

The inventors have noticed that, in the prior art, requests for computing resources (e.g., processors) are processed in a queue. When computing resources cannot process requests in time, the requests that cannot be processed will be congested in the queue. When a plurality of requests request computing resources at the same time, a corresponding processing order cannot be determined. In addition, when malware sends requests in batches, the requests of the malware cannot be identified in the prior art, either, so that they cannot be added to a blacklist. Instead, the requests of the malware are also put into the queue, so that requests of normal software cannot be processed in time. Therefore, there is a need for a method for request controlling to improve the capability of controlling requests for computing resources and rejecting batches of requests sent by malware.

In view of this, the method of the present disclosure provides a method for request controlling, which can determine a control window according to the time when a request is received, and further divide the control window into a plurality of control time slots, thereby refining the granularity of request controlling, rather than simply enqueuing the request to wait for processing. It will be understood from the following description that, compared with the known conventional solutions, by controlling requests through control windows and control time slots, the processing capacity of processing resources can be effectively determined, and according to this, requests can be processed in time to reduce congestion. Therefore, the working principle and mechanism of the present disclosure are significantly different from any known methods.

In the following description, certain embodiments will be discussed with reference to requests sent by an application through an API. However, it should be understood that this is only for a better understanding of the principles and ideas of the embodiments of the present disclosure, and is not intended to limit the scope of the present disclosure in any way.

FIG. 1 illustrates a schematic diagram of example environment 100 in which embodiments of the present disclosure can be implemented.

Request 102-1 and request 102-2 of FIG. 1 are sent to computing resource 101 (e.g., a processor). There may be a plurality of requests, e.g., first request 102-1, second request 102-2, . . . , $N^{th}$ request 102-N (referred to individually or collectively as request 102). For the convenience of description, computing resources 101 or processors will not be distinguished in the following description.

After request 102 is sent to the processor, a decision of whether to process the request by the processor needs to be made. The request is sent to the processor for processing only when it is within the processing capacity of the processor.

It should be understood that example environment 100 shown in FIG. 1 is illustrative only and is not intended to limit the scope of the present disclosure. Various additional devices, apparatuses, and/or modules may also be included in example environment 100. Moreover, the modules shown in FIG. 1 are also only illustrative and are not intended to limit the scope of the present disclosure. In some embodiments, certain modules may be integrated into one physical entity, or may further be split into more modules.

Figure 2:
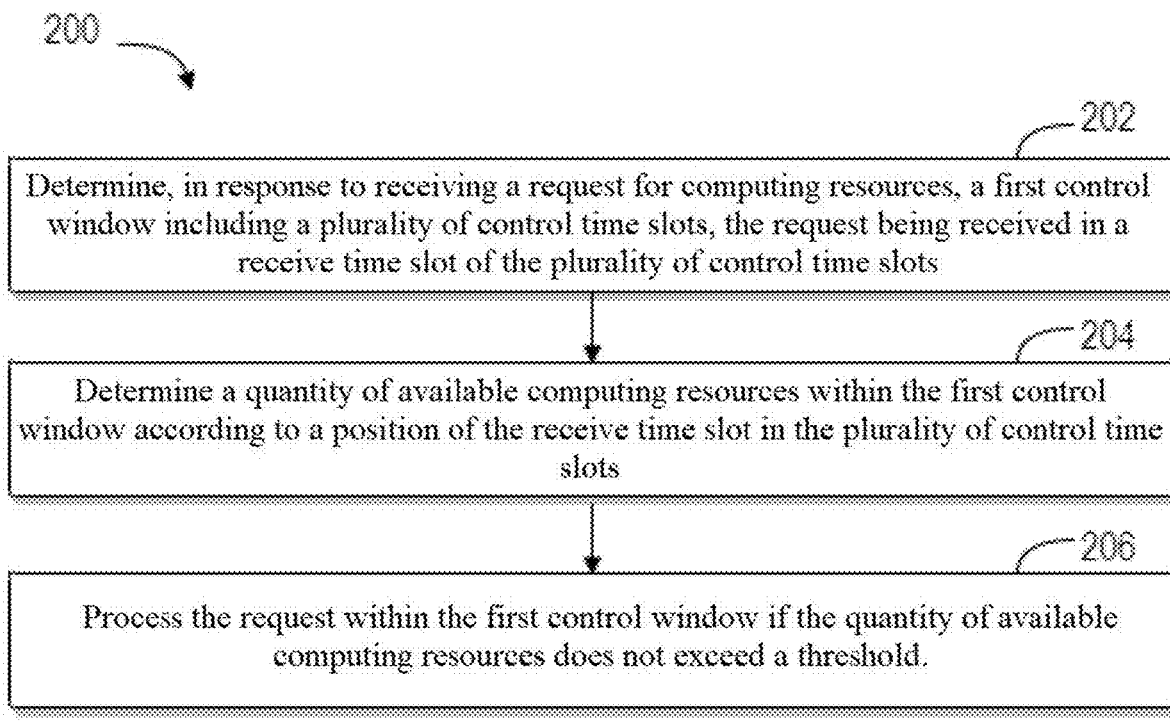
FIG. 2 illustrates a flow chart of a method for request controlling according to some embodiments of the present disclosure.

FIG. 2 illustrates a flow chart of a method for request controlling according to some embodiments of the present disclosure.

For the convenience of description, the request controlling process implemented by method 200 will be described by taking a request sent by an application through an API as an example. However, as stated above, this is only an example and is not intended to limit the scope of the present disclosure in any way. Method 200 described herein is equally applicable to a process for requests sent by other subjects.

At block 202, in response to receiving a request for computing resources, a first control window including a plurality of control time slots is determined, the request being received in a receive time slot of the plurality of control time slots.

As an example, after request 102 is received, a control window will be determined, which is hereinafter referred to as a first control window for convenience of description. The first control window includes a plurality of control time slots, or in other words, the first control window is divided into a plurality of control time slots with shorter lengths. In this way, request 102 is received in a receive time slot of the plurality of control time slots.

At block 204, a quantity of available computing resources within the first control window is determined according to a position of the receive time slot in the plurality of control time slots.

Figures 3, 4, 5:
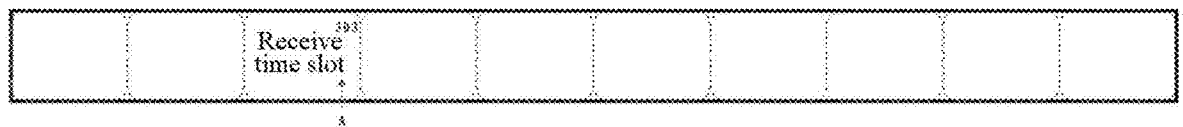
FIG. 3 illustrates a schematic diagram of a first control window according to some embodiments of the present disclosure.
FIG. 4 illustrates a schematic diagram of a relationship between a first control window and a second control window according to some embodiments of the present disclosure.
FIG. 5 illustrates a block diagram of an apparatus for request controlling according to some embodiments of the present disclosure.

FIG. 3 illustrates a schematic diagram of a first control window according to some embodiments of the present disclosure. Method 200 will be described below with reference to FIG. 3.

As shown in FIG. 3, arrow A indicates receive time slot 303 in which request 102 is received. The quantity of available computing resources within the first control window is determined according to the position of receive time slot 303 in the first control window.

In some embodiments, the quantity of available computing resources within the first control window may be determined according to a ratio of a length starting from the first control window to the receive time slot to a length of the first control window.

In some embodiments, the quantity of available computing resources within the first control window may be determined through the following formula.

$$A_{req} = p * l_{max} * \frac{l_a}{l_b} \quad (1)$$

$A_{req}$ indicates the quantity of available computing resources.

$l_a$ indicates the length starting from the first control window to the receive time slot.

$l_b$ indicates the length of the first control window.

p indicates a control parameter of the receive time slot.

$l_{max}$ indicates the predetermined maximum quantity of computing resources allowed by the first control window, that is, a threshold.

In some embodiments, the size of available storage resources within the first control window may further be determined through the following formula.

$$M_{req} = p * M_{max} * \frac{l_a}{l_b} \qquad (2)$$

$M_{req}$ indicates the size of available storage resources within the first control window.

$M_{max}$ indicates the predetermined maximum size of storage resources allowed by the first control window, that is, a storage threshold.

In some embodiments, it may also be determined that request 102 can be processed according to that the value of $M_{req}$ does not exceed storage threshold $M_{max}$.

At block 206, the request is processed within the first control window if the quantity of available computing resources does not exceed a threshold. In some embodiments, it may be determined that the request can be processed within the first control window according to that the value of $A_{req}$ does not exceed the threshold.

In some embodiments, the control parameter of the receive time slot may also be set as a burst request coefficient, the burst request coefficient indicating the maximum number of requests that the processor can process simultaneously in one control time slot and the number of requests that can be processed in one control time slot in a standard situation.

In some embodiments, the quantity of available computing resources to which the burst request coefficient is applied may be determined through the following formula.

$$A_{req}' = A_{req} * \text{burst} \qquad (3)$$

In some embodiments, the size of storage resources allowed to be used in the first control window to which the burst request parameter is applied may be determined by the following formula.

$$M_{req}' = M_{req} * \text{burst} \qquad (4)$$

where burst indicates the burst request parameter. Therefore, it may be determined that the request can be processed within the first control window according to that the value of $A_{req}'$ does not exceed $l_{max}$. In some embodiments, it may further be determined that the request can be processed within the first control window according to that the value of $M_{req}'$ does not exceed $M_{max}$.

Through method 200, a control window may be determined according to the time when a request is received, and the control window can further be divided into a plurality of control time slots, thereby refining the granularity of request controlling, rather than simply enqueuing the request to wait for processing. Determining corresponding available computing resources according to the control time slot can allow requests, once sent to the processor, to be processed in time without queuing. Therefore, method 200 can reduce congestion.

In some embodiments, method 200 further includes determining a second control window including a plurality of control time slots, the second control window and the first control window having a time interval therebetween.

FIG. 4 illustrates a schematic diagram of a relationship between a first control window and a second control window according to some embodiments of the present disclosure.

As shown in FIG. 4, a second control window including a plurality of control time slots may be determined, and time interval G exists between the second control window and the second control window.

In some embodiments, the length of time interval G is less than the length of the second control window.

The quantity of available computing resources within the second control window may be determined according to the length of the time interval and the length of the first control window.

In some embodiments, the quantity of available computing resources within the second control window may be determined according to the following formula.

$$A_{req2} = \frac{l_b + l_g}{l_b} * l_{max} \qquad (5)$$

$A_{req2}$ indicates the quantity of available computing resources within the second control window.

$l_g$ indicates the length of time interval G.

In some embodiments, the size of available storage resources within the second control window may further be determined through the following formula.

$$M_{req2} = \frac{l_b + l_g}{l_b} * M_{max} \qquad (6)$$

In some embodiments, it may be determined that the request can be processed within the second control window according to that a difference between the number of all requests received in the first control window and in time interval G and the value of $A_{req2}$ does not exceed a threshold. In some embodiments, it may also be determined that the request can be processed within the second control window according to that the value of $M_{req2}$ does not exceed a storage threshold.

In some embodiments, a predetermined connection threshold may also be utilized to determine that the request can be processed. The connection threshold indicates the number of requests from one API that the processor can process simultaneously. If the quantity of available computing resources does not exceed the threshold, but the number of requests actually sent to the computing resources exceeds the connection threshold, the request may be rejected within the first control window.

A penalty mechanism is set for batches of requests sent by malware since time interval G is taken into account and the burst request parameter is canceled in the determination of $A_{req2}$, as well as the connection threshold is taken into account. Compared with conventional queue mechanisms, when malware keeps sending requests in batches, these batches of requests can only be processed according to the penalty mechanism and cannot occupy the processor for a long time.

FIG. 5 illustrates a block diagram of apparatus 500 for request controlling according to some embodiments of the present disclosure.

Control window determining module 502 is configured to determine, in response to receiving a request for computing resources, a first control window including a plurality of control time slots, the request being received in a receive time slot of the plurality of control time slots.

Resource quantity determining module 504 is configured to determine a quantity of available computing resources within the first control window according to a position of the receive time slot in the plurality of control time slots.

In some embodiments, the determining a quantity of available computing resources within the first control window according to a position of the receive time slot in the plurality of control time slots may include: determining the quantity of available computing resources within the first control window according to a ratio of a length starting from the first control window to the receive time slot to a length of the first control window.

Request control module 506 is configured to process the request within the first control window if the quantity of available computing resources does not exceed a threshold.

In some embodiments, control window determining module 502 may further be configured to determine a second control window including a plurality of control time slots, the second control window and the first control window having a time interval therebetween.

In some embodiments, the time interval is less than the length of the first control window or the second control window.

In some embodiments, resource quantity determining module 504 may further be configured to determine a quantity of available computing resources within the second control window according to the sum of the length of the time interval and the length of the first control window.

Request control module 506 is further configured to process the request within the second control window if the quantity of available computing resources in the second control window does not exceed a threshold.

In some embodiments, resource quantity determining module 504 may further be configured to determine a size of available storage resources within the first control window according to the position of the receive time slot in the plurality of control time slots, and request control module 506 is further configured to process the request within the first control window if the size of the available storage resource does not exceed a storage threshold.

It can be understood that by using apparatus 500, a control window and a receive time slot may be determined according to the time when a request is received, thereby refining the granularity of request controlling, rather than simply enqueuing the request to wait for processing. By using the time interval and corresponding control procedure, batches of requests sent by malware can be controlled. Therefore, apparatus 500 may also provide at least one of the aforementioned advantages of method 200.

Figure 6:
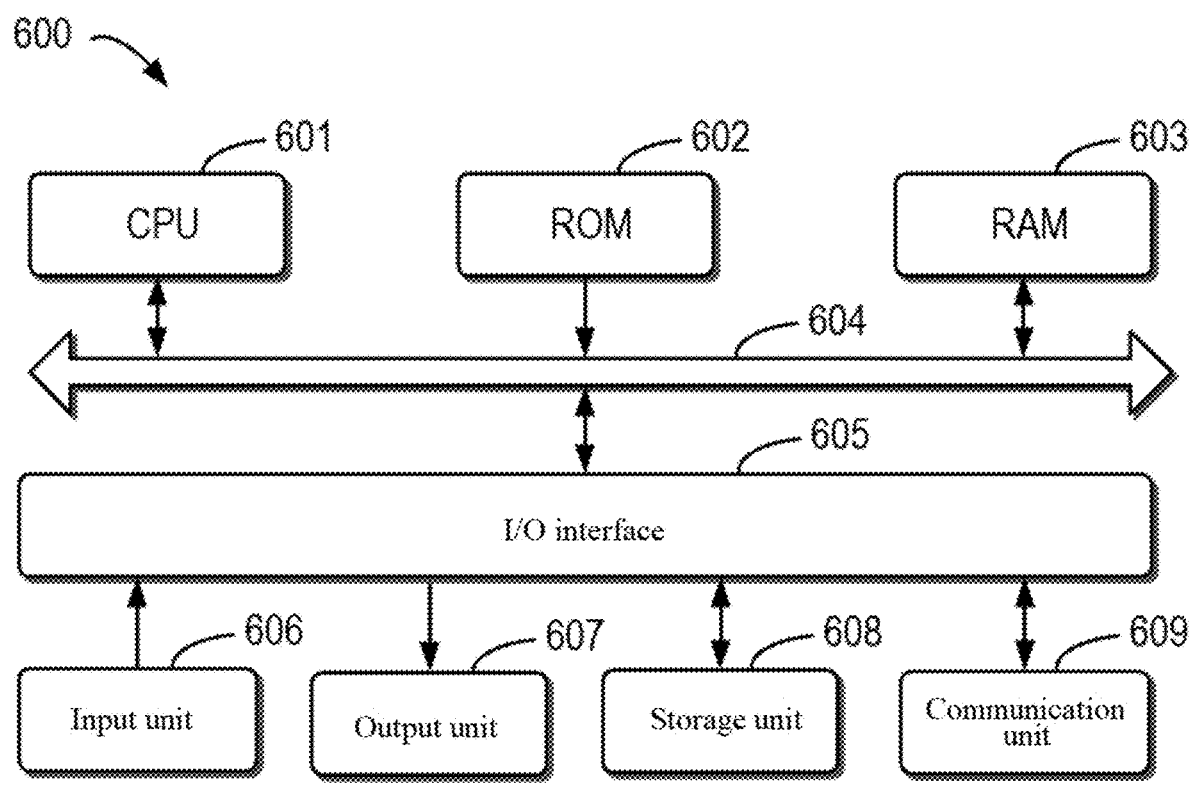
FIG. 6 illustrates a schematic block diagram of an example device that may be configured to implement some embodiments of the present disclosure.

FIG. 6 illustrates a schematic block diagram of device 600 that may be configured to implement embodiments of the present disclosure. Device 600 may be the device or apparatus described in the embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604. Although not shown in FIG. 6, device 600 may also include a co-processor.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by processing unit 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer programs are loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various embodiments of the present disclosure have been described above. The foregoing description is illustrative rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

Some example implementations of the present disclosure are listed below.

In a first aspect of the present disclosure, a method for request controlling is provided. The method includes determining, in response to receiving a request for computing resources, a first control window including a plurality of control time slots, the request being received in a receive time slot of the plurality of control time slots. The method further includes determining a quantity of available computing resources within the first control window according to a position of the receive time slot in the plurality of control time slots. The method further includes processing the request within the first control window if the quantity of available computing resources does not exceed a threshold.

In some embodiments, the determining a quantity of available computing resources within the first control window according to a position of the receive time slot in the plurality of control time slots includes determining the quantity of available computing resources within the first control window according to a ratio of a length starting from the first control window to the receive time slot to a length of the first control window.

In some embodiments, the method further includes determining a second control window including a plurality of control time slots, the second control window and the first control window having a time interval therebetween.

In some embodiments, the time interval is less than the length of the first control window or the second control window.

In some embodiments, the method further includes determining a quantity of available computing resources within the second control window according to the sum of the length of the time interval and the length of the first control window.

In some embodiments, the method further includes processing the request within the second control window if the quantity of available computing resources within the second control window does not exceed a threshold.

In some embodiments, the method further includes determining a size of available storage resources within the first control window according to a position of the receive time slot in the plurality of control time slots. The method further includes processing the request within the first control window if the size of available storage resources does not exceed a storage threshold.

In a second aspect of the present disclosure, an electronic device is provided. The electronic device includes a processor and a memory coupled to the processor, the memory having instructions stored therein which, when executed by the processor, cause the device to perform actions. The actions include determining, in response to receiving a request for computing resources, a first control window including a plurality of control time slots, the request being received in a receive time slot of the plurality of control time slots. The actions further include determining a quantity of available computing resources within the first control window according to a position of the receive time slot in the plurality of control time slots. The actions further include processing the request within the first control window if the quantity of available computing resources does not exceed a threshold.

In some embodiments, the determining a quantity of available computing resources within the first control window according to a position of the receive time slot in the plurality of control time slots includes determining the quantity of available computing resources within the first control window according to a ratio of a length starting from the first control window to the receive time slot to a length of the first control window.

In some embodiments, the actions further include determining a second control window including a plurality of control time slots, the second control window and the first control window having a time interval therebetween.

In some embodiments, the time interval is less than the length of the first control window or the second control window.

In some embodiments, the actions further include determining a quantity of available computing resources within the second control window according to the sum of the length of the time interval and the length of the first control window.

In some embodiments, the actions further include processing the request within the second control window if the quantity of available computing resources within the second control window does not exceed a threshold.

In some embodiments, the actions further include determining a size of available storage resources within the first control window according to a position of the receive time slot in the plurality of control time slots. The actions further include processing the request within the first control window if the size of available storage resources does not exceed a storage threshold.

In an embodiment of a third aspect, an apparatus for request controlling is provided. The apparatus includes: a control window establishing module configured to determine, in response to receiving a request for computing resources, a first control window including a plurality of control time slots, the request being received in a receive time slot of the plurality of control time slots. The apparatus further includes a resource quantity determining module configured to determine a quantity of available computing resources within the first control window according to a position of the receive time slot in the plurality of control time slots. The apparatus further includes a request control module configured to process the request within the first control window if the quantity of available computing resources does not exceed a threshold.

In an embodiment of a fourth aspect, a computer-readable storage medium is provided. The computer-readable storage medium has one or more computer instructions stored thereon, wherein the one or more computer instructions are executed by a processor to implement the method according to the first aspect.

In an embodiment of a fifth aspect, a computer program product is provided. The computer program product includes one or more computer instructions, wherein the one or more computer instructions, when executed by a processor, implement the method according to the first aspect.

Although the present disclosure has been described in language specific to structural features and/or methodological actions, it is to be understood that the subject matter defined in the appended claims is not necessarily limited to the specific features or actions described above. Rather, the specific features and actions described above are merely example forms of implementing the claims.

The invention claimed is:

1. A method for request controlling, comprising:
   determining, in response to receiving a request for computing resources, a first control window comprising a plurality of control time slots, the request being received in a receive time slot of the plurality of control time slots;
   determining a quantity of available computing resources within the first control window according to 1) a position of the receive time slot in the plurality of control time slots and 2) a ratio of a length calculated from a start of the first control window to the receive time slot to an entire length of the first control window; and
   processing the request within the first control window if the quantity of available computing resources does not exceed a threshold.

2. The method according to claim 1, further comprising:
   determining a second control window comprising a plurality of control time slots, the second control window and the first control window having a time interval therebetween.

3. The method according to claim 2, wherein the time interval is less than the length of the first control window or the second control window.

4. The method according to claim 3, further comprising:
   determining a quantity of available computing resources within the second control window according to the sum of the length of the time interval and the length of the first control window.

5. The method according to claim 3, further comprising:
   processing the request within the second control window if the quantity of available computing resources within the second control window does not exceed the threshold.

6. The method according to claim 1, further comprising:
   determining a size of available storage resources within the first control window according to the position of the receive time slot in the plurality of control time slots; and
   processing the request within the first control window if the size of the available storage resources does not exceed a storage threshold.

7. An electronic device, comprising:
   a processor; and
   a memory coupled to the processor, wherein the memory has instructions stored therein, and the instructions, when executed by the processor, cause the device to execute actions comprising:
   determining, in response to receiving a request for computing resources, a first control window comprising a plurality of control time slots, the request being received in a receive time slot of the plurality of control time slots;

determining a quantity of available computing resources within the first control window according to 1) a position of the receive time slot in the plurality of control time slots and 2) a ratio of a length calculated from a start of the first control window to the receive time slot to an entire length of the first control window; and processing the request within the first control window if the quantity of available computing resources does not exceed a threshold.

8. The electronic device according to claim 7, wherein the actions further comprise:

determining a second control window comprising a plurality of control time slots, the second control window and the first control window having a time interval therebetween.

9. The electronic device according to claim 8, wherein the time interval is less than the length of the first control window or the second control window.

10. The electronic device according to claim 9, wherein the actions further comprise:

determining a quantity of available computing resources within the second control window according to the sum of the length of the time interval and the length of the first control window.

11. The electronic device according to claim 9, wherein the actions further comprise:

processing the request within the second control window if the quantity of available computing resources within the second control window does not exceed the threshold.

12. The electronic device according to claim 7, wherein the actions further comprise:

determining a size of available storage resources within the first control window according to the position of the receive time slot in the plurality of control time slots; and processing the request within the first control window if the size of the available storage resources does not exceed a storage threshold.

13. A non-transitory computer-readable medium having instructions stored therein, which when executed by a processor, cause the processor to perform operations of request controlling, the operations comprising:

determining, in response to receiving a request for computing resources, a first control window comprising a plurality of control time slots, the request being received in a receive time slot of the plurality of control time slots;

determining a quantity of available computing resources within the first control window according to 1) a position of the receive time slot in the plurality of control time slots and 2) a ratio of a length calculated from a start of the first control window to the receive time slot to an entire length of the first control window; and processing the request within the first control window if the quantity of available computing resources does not exceed a threshold.

14. The computer-readable medium according to claim 13, wherein the operations further comprise:

determining a second control window comprising a plurality of control time slots, the second control window and the first control window having a time interval therebetween.

15. The computer-readable medium according to claim 14, wherein the time interval is less than the length of the first control window or the second control window.

16. The computer-readable medium according to claim 15, wherein the operations further comprise:

determining a quantity of available computing resources within the second control window according to the sum of the length of the time interval and the length of the first control window.

17. The computer-readable medium according to claim 15, wherein the operations further comprise:

processing the request within the second control window if the quantity of available computing resources within the second control window does not exceed the threshold.

* * * * *